No. 609,045. Patented Aug. 16, 1898.
F. W. PHILLIPS.
CHECKING APPARATUS FOR REGISTERING PAYMENTS ON VEHICLES, &c.
(Application filed Feb. 18, 1898.)
(No Model.) 2 Sheets—Sheet 1.
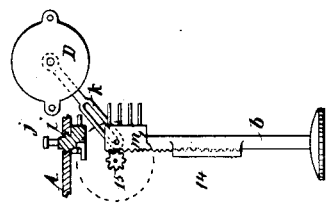
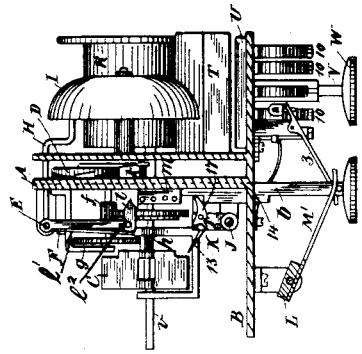
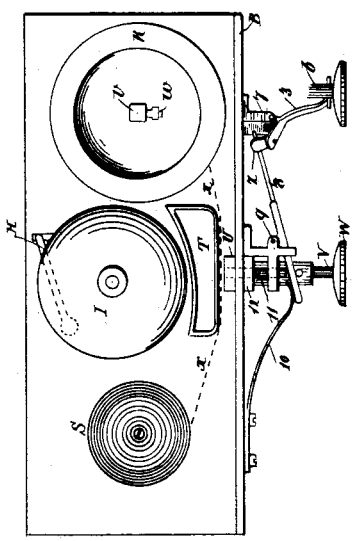
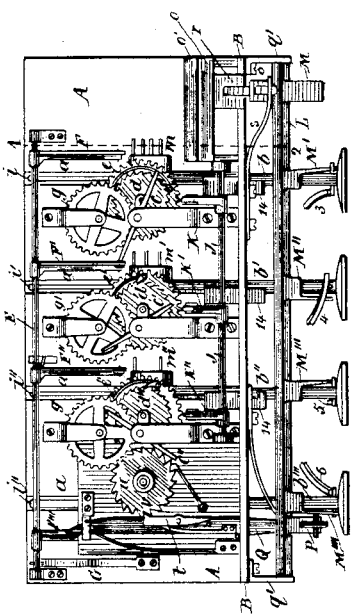
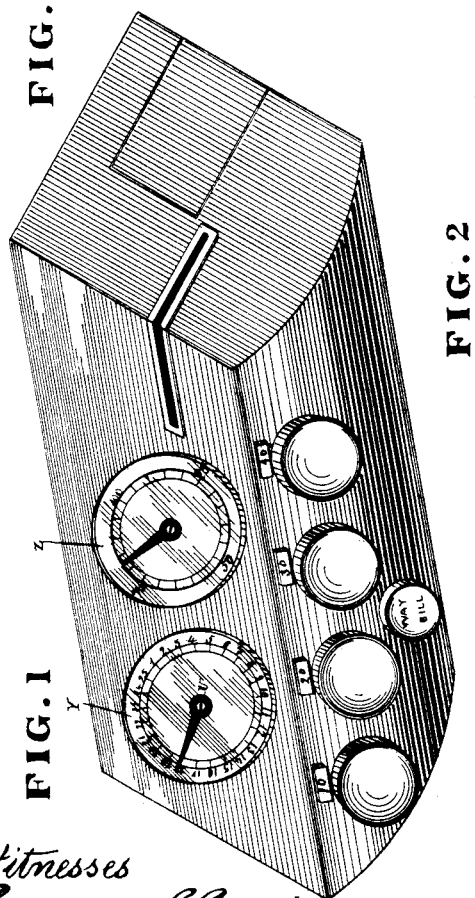
Witnesses
Edmund S. Snewin
Henry Mayfield
Inventor
Frederick Wm Phillips
by Attorney
Fredk Walker No. 609,045. Patented Aug. 16, 1898.
F. W. PHILLIPS.
CHECKING APPARATUS FOR REGISTERING PAYMENTS ON VEHICLES, &c.
(Application filed Feb. 18, 1898.)
(No Model.) 2 Sheets—Sheet 2.
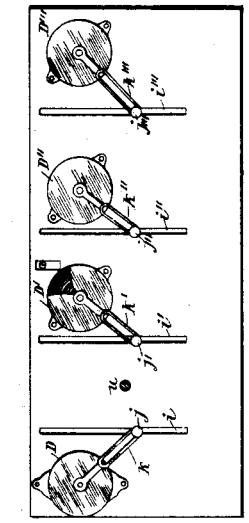
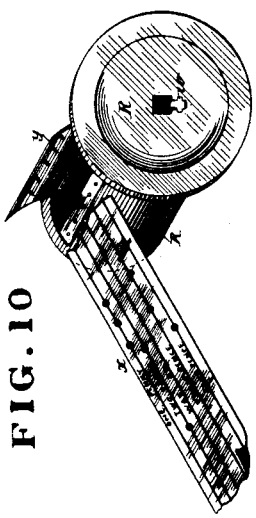
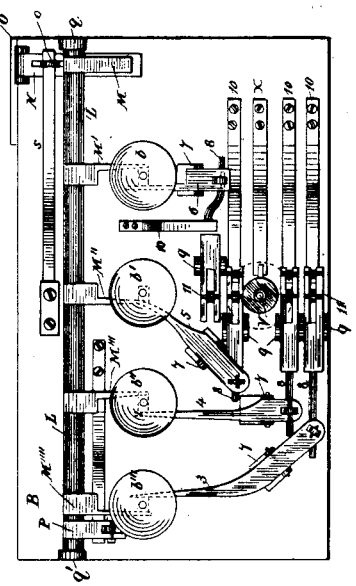
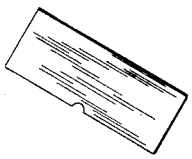
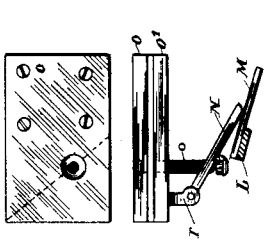
Witnesses
Edmund S. Snewin
Henry Mayfely
Inventor
Fredk Wm Phillips
By Attorney
Fredk R Walker

UNITED STATES PATENT OFFICE.

FREDERICK WM. PHILLIPS, OF LONDON, ENGLAND.

CHECKING APPARATUS FOR REGISTERING PAYMENTS ON VEHICLES, &c.

SPECIFICATION forming part of Letters Patent No. 609,045, dated August 16, 1898.

Application filed February 18, 1898. Serial No. 670,769. (No model.)

*To all whom it may concern:*

Be it known that I, FREDERICK WM. PHILLIPS, mechanician, a subject of Her Majesty the Queen of Great Britain, residing at 2 Harcourt Villas, Harcourt road, Bexley Heath, London, in the county of Kent, England, have invented certain new and useful Improvements in Checking Apparatus for Registering Payments on Vehicles and Commercial Transactions Generally; and I do hereby declare the following to be a full, clear, and exact description of the invention, such as will enable others skilled in the art to which it appertains to make and use the same.

My invention relates to certain improvements in checking apparatus for registering payments on vehicles and commercial transactions generally, and has for its object the prevention of fraud by means of three separate checks—as, for instance, in the case of an omnibus or tram-car ticket-punch, there is provided, first, an audible signal denoting the amount paid by the passenger; secondly, a scaled register or indicator of such amount, and, thirdly, an automatically-operated way-bill which is not accessible to any person but duly-authorized officials. An additional advantage is in the manner of punching the tickets, which practically prevents them from being employed a second time.

In adapting my invention to a checking and registering system, such as may be used at large commercial establishments, such as stores and the like, I employ the same mechanism with certain modifications of detail, the essential features of the said invention remaining the same.

In order that my invention may be clearly understood, I have appended the accompanying two sheets of drawings, in which—

Figure 1, Sheet 1, is a perspective view of a four-push vehicle check-punch which I have chosen as an example for illustration. Fig. 2 is a front elevation of the mechanism with the cover removed, and Fig. 3 a back elevation thereof. Fig. 4 is an end sectional elevation of the same on lines 1 2, Fig. 2; and Fig. 5, a front elevation of a key, rack, striker, and spring, shown detached, with a transverse section of the slide shown above. Fig. 6, Sheet 2, is a plan view of the under side of the base-plate, showing the register-punches for the automatic way-bill. Fig. 7 is an elevation of the back of the slide-plate, showing the coiled springs. Fig. 8 is a plan and elevation of the ticket-punch and plate shown detached. Fig. 9 is a ticket, showing the manner of punching. Fig. 10 shows a part of the way-bill and winding-drum.

Similar letters and numerals of reference indicate corresponding parts throughout the several views.

In carrying my invention into effect I mount a vertical plate A upon a base B, with one or more parallel guides $a$ formed upon it. In the example chosen as an illustration there are four of these guides $a\ a'\ a''\ a'''$, carrying sliding racks $b\ b'\ b''\ b'''$ and suitably dovetailed or otherwise shaped to retain them in position while freely moving up or down. Each sliding rack corresponds to a price or fare, such as one penny, twopence, threepence, and fourpence, or any other predetermined rate or value of coinage or tokens. A rack is shown separately by Fig. 5, the sectional view showing the fit within the guides $a$, formed in the plate A. Each rack engages with a pinion 15, loosely fitted upon its arbor, but carrying a ratchet-wheel $d\ d'\ d''$, which revolves upon the face of and concentric with a toothed wheel $e\ e'\ e''$, to which it is connected by a pawl and spring, so that the racks $b\ b'\ b''\ b'''$ may be pushed up without revolving said wheel $e$, which engages with a pinion $f$, carrying upon its arbor a toothed wheel $g\ g'\ g''$, which drives a flier or air-resistance $C\ C'\ C''$ by means of a pinion $h$. This arrangement is clearly shown by Figs. 2 and 4. A slot $i$ is formed through the plate A in the center of each guide $a$, and a pin $j$, Figs. 5 and 7, passes through to the back and, being attached to the rack $b$, rises and falls with it. At the back of the plate A and attached to it are spring-boxes $D\ D'\ D''\ D'''$, with coiled springs inside them and arranged as shown by Fig. 7. A slotted lever-arm $k\ k'\ k''\ k'''$ upon the arbor of each spring connects it with the corresponding rack by the pin $j\ j'\ j''\ j'''$. The spring is thus placed in tension when the rack is raised, and depresses it slowly as the train of gearing and the flier C are actuated. Transversely across the plate A, I fix a spindle E, carrying levers $F\ F'\ F''\ F'''$ opposite each rack, said spindle being kept in position by a spring G or equivalent means. At the lower end of each lever is a trip-catch $l$, controlled by a spring $l'$ and stop $l^2$. Upon the corresponding rack is a boss $m$, carrying one or more pins, according to the number of pence or other rate corresponding to each rack. When said rack $b$ is pressed upward, the pins on $m$ lift the trip-catch $l$ without moving the lever F; but on the downward stroke the trip-catch $l$ is held by the stop, Fig. 4, and the lever F moved back each time that a pin passes the beveled end of catch $l$. To provide for this action, the said trip-catch is pivoted near one corner of its square end, so that when it straightens out in line with its lever the other corner of the said end will come in contact with the said stop and prevent the said catch from turning too far the other way. The flat spring F bears at its free end against the straight back of this catch when the latter is in line with the lever and bears against the square end of the said catch when the latter is turned at right angles with the lever, as shown in Fig. 4. In either position the said spring prevents the accidental dislodgment of the said lever. A rod H, carrying a striker, is fixed to the spindle E, and thus strikes the gong I a number of times, equal to the amount paid.

In order to insure that each rack $b$ shall be pressed to the full length of its travel and the proper audible signal obtained, I place a transverse spindle J near the base-plate B, carrying cranks K K' K'' opposite and corresponding to each rack $b$. Upon the outside of each crank K a pin 13 is fixed, so that it is clear of the flier C of the train nearest to it when the crank K is in its normal position. A trip-catch 17 is pivoted on the face of said crank K, with its point inclining toward the rack $b$, Fig. 4. A projecting piece 14 upon the rack $b$ is arranged to come into contact with trip-catch 17 directly the rack is moved upward, and moving the crank K brings the pin 13 in the path of the flier C, stopping its motion until the projecting piece 14 is clear of the trip-catch 17. This being effected when the complete travel of the rack is accomplished the downward movement simply deflects the trip-catch 17 and allows the crank K to resume its normal position. This mechanical action has a double purpose in that it checks the train during the upward movement and also prevents two rings being given for a fourpenny fare, and so on, and the spindle J being common to all the racks it follows that if it is displaced by reason of one not being pushed inward to its full extent the rest are locked and inoperative until the one in question has been pressed home. It is obvious that in both cases I may reverse the arrangement by placing the trip-catches $l$ and 17 upon the rack $b$ and the pins $m$ and projection 14 upon the cranks F and K, respectively, without departing from my invention. A bar L is pivoted at $q$ $q'$ underneath the base-plate B and has cranks M, M', M'', M''', and M'''' attached to it. The tapered lower ends of M' M'' M''' M'''' rest upon pins at the lower extremities of the racks $b$ $b'$ $b''$ $b'''$ above the push-buttons which terminate them. Thus either of said racks being pressed on the upward movement causes the bar L to be deflected. The crank M presses against a second crank N, which carries the slotted lower end of the ticket-punch $o$. (Shown more distinctly by the detached view, Fig. 8.) Said punch works freely through the lower jaw O into the matrix O' each time that the bar L is deflected—that is to say, by the movement of either of the racks $b$—and a semicircular piece is punched out of the ticket, as shown by Fig. 9. This is the preferable method of punching, since a used ticket is more likely to start a crack from the puncture when bent than would be the case if the hole were circular, as is usual. A spring $s$ is fixed to the base B and its free end inclosed by the punch $o$, keeping it in a normal open position and also tending to maintain the bar L in a similar position. Another crank P is fixed to the bar L, which raises and lowers a slide Q, which carries a pawl $t$, engaging with a ratchet $u$, mounted upon a spindle $v$, which passes through the plate A and carries a winding-drum R, Figs. 3, 4, and 10, behind it. Thus as the bar L is common to all the racks $b$ the inward movement of either of them advances it one tooth, the pawl $t$, having a vertical clearance on the upstroke, preventing it from feeding at a greater rate. Said drum R fits freely upon a square on the spindle $v$, so that it may readily be withdrawn when required, a spring-key $w$ or like contrivance holding it in position. A drum S of paper, Fig. 3, is arranged to unroll as the drum R is fed, the strip $x$ passing under a guide and blank-box T over a punch-block U, carrying five punches, hereinafter to be described. The paper is held upon the feeding-drum R by a hinged spring-clip $y$, Fig. 10, with teeth for securely holding it.

In Fig. 2 certain levers 3, 4, 5, and 6 are shown as broken off, so that the introduction of the punching-gear, hereinbefore mentioned, should not impede the clearness of the drawings; but upon Fig. 3 the action of the lever 3, resting upon the pin of the rack $b''''$, is shown, and the plan view of the bottom of the base-plate B, Fig. 6, shows the whole arrangement. A lever 3, the free end of which rests upon the pin of rack $b$, is pivoted at 7 and carries the end of a second lever 8 by a coupling-link $z$ to allow of free movement. The lever 8 is pivoted at 9 and is kept in its normal position by a flat spring 10. A punch 11, passing through the punch-block U, engages with said lever 8, so that when the rack $b$ is pressed inward the outer member of lever 3 is raised, depressing the inner member and the outer member of lever 8. The inner member of lever 8, carrying the punch 11, is thus raised against the spring 10 and the strip $x$ is punched.

In the plan view, Fig. 6, the aforesaid arrangement is simply followed, with the exception that the angle of each lever necessarily varies according to its position, and the figures indicating the parts are the same. Lever 6, for instance, is arranged so as to operate its punch from the opposite side. A central punch V, operated by a press-button W against a spring X, is termed the "way-bill" punch and marks the end, half, or any predetermined part of a journey upon the traveling strip of paper called the "way-bill." (Shown by $x$, Figs. 3 and 10.)

The outer end of the drum-spindle $v$ carries an index Y, Fig. 1, which indicates at sight each fare registered, and an ordinary train of wheels connected to this within the case causes the multiplying-index Z to further indicate the aggregate. I may, however, use a separate dial and index for each rack, so that all the amounts may be read at sight.

Now the manner in which the different checks are simultaneously effected is as follows—that is to say, a ticket is placed in the slot between the punch-blocks O O' and either of the racks raised by pressing the button, the number or position of the rack corresponding to the fare or payment. For example, suppose this to be $b'$, corresponding to threepence. The ticket is punched, and if the rack be pressed to its full travel it will cause the bell I to be struck three times. If, however, the full travel is not given, the bell will not strike, and that rack and the other racks be rendered inoperative on the downward movement until the first is cleared. The way-bill is also fed forward, and the punch 11 corresponding to the rack $b'$ perforates it in the right place, and the sight indicator Y is also moved to register a fare or payment. It will be seen then that the purchaser or passenger has an ocular as well as an audible demonstration of the due registry of payment, while the traveling register or way-bill shows at sight the various payments and their several amounts. Referring now to Fig. 10, the way-bill $x$ has been marked by its central punch in due course, and one shilling and sevenpence are registered beyond the way-bill mark. Another check consists in the collection of the punched blanks above the punch-block O, which may be withdrawn by means of a suitable lid or drawer. The whole is inclosed within a case, as shown by Fig. 1, so that no part may be tampered with, and is made of light and strong material.

In adapting my invention to cash-tills and stationary check-registering apparatus I use the same mechanism, merely modifying the details to suit the different conditions of application.

Having thus described my invention, I declare that what I claim is—

1. In checking apparatus for registering payments on vehicles and similar commercial transactions the combination of a rack $b$ with striking-pins $m$, check-lever K, fly-train and spring-box D with a rocking spindle L operating a punch $o$ and register feed-bar Q and register-punch 11 substantially as set forth.

2. In checking apparatus for registering payments on vehicles and similar commercial transactions, the combination of a rack $b$ with a fly-wheel train of gearing meshing with said rack, a stop-pin engaging a part of the said gearing, a crank-shaft for moving the said pin into and out of locking position, means whereby the said shaft is actuated by the depression of the said rack for preventing any return action until the completion of the stroke, and a bell-striking device operating on the return action, substantially as herein described with reference to the appended drawings.

3. In checking apparatus for registering payments on vehicles and similar commercial transactions, means for registering the payments on a continuous slip in direct lines representing the value of each payment, a blank-box T with a plane surface over which said slip is stretched to be marked, a punch V, operated independently of the said registering apparatus and arranged to mark said slip at the end or any part of the journey, an audible signal operated in combination with said punch V, and a dial-indicator, substantially as described and shown.

In testimony whereof I affix my signature in presence of two witnesses.

FREDK. WM. PHILLIPS.

Witnesses:
EDMUND S. SNEWIN,
HENRY MAYKELS.